(12) United States Patent
Kang

(10) Patent No.: US 10,899,298 B2
(45) Date of Patent: Jan. 26, 2021

(54) WIRELESS POWER TRANSFER SYSTEM FOR VEHICLE DOOR GLASS

(71) Applicants: HYUNDAI MOTOR COMPANY, Seoul (KR); KIA MOTORS CORPORATION, Seoul (KR)

(72) Inventor: Kwan Hui Kang, Hwaseongsi (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/594,626

(22) Filed: Oct. 7, 2019

(65) Prior Publication Data
US 2020/0298773 A1 Sep. 24, 2020

(30) Foreign Application Priority Data
Mar. 20, 2019 (KR) .................. 10-2019-0031742

(51) Int. Cl.
*B60J 1/17* (2006.01)
*B60J 1/20* (2006.01)
(Continued)

(52) U.S. Cl.
CPC .............. *B60R 16/027* (2013.01); *B60J 1/17* (2013.01); *B60J 1/2016* (2013.01); *B60J 1/2019* (2013.01);
(Continued)

(58) Field of Classification Search
CPC . B60J 1/17; B60J 1/2011; B60J 1/2016; B60J 1/2019; B60J 3/04; B60R 16/027; B60R 16/03; B60R 16/033; E05F 15/00; E05Y 2900/55; E06B 9/24; E06B 2009/2464; G02B 26/02; G02F 1/0121; H02J 50/10; H02J 50/12
See application file for complete search history.

(56) References Cited

U.S. PATENT DOCUMENTS 10,654,343 B2  5/2020 Kang et al.
2012/0200150 A1  8/2012 Urano
(Continued)

FOREIGN PATENT DOCUMENTS

FR  2 989 319 A1  10/2013
JP  2010-132142 A  6/2010
(Continued)

OTHER PUBLICATIONS

Office Action issued in corresponding U.S. Appl. No. 16/007,013 dated Mar. 30, 2020.
(Continued)

*Primary Examiner* — Levi Gannon
(74) *Attorney, Agent, or Firm* — Morgan, Lewis & Bockius LLP

(57) ABSTRACT

A wireless power transfer system for a vehicle door glass includes: a door glass having an electric load, and a pair of electrodes connected to the electric load; a power transmitter mounted in a vehicle door, and wirelessly transmitting power of a battery; and a power receiver embedded in the door glass, and wirelessly receiving the power from the power transmitter, wherein the power receiver applies the power received from the power transmitter to the pair of electrodes of the door glass.

11 Claims, 14 Drawing Sheets

(51) Int. Cl.
*E06B 9/24* (2006.01)
*H02J 50/10* (2016.01)
*B60R 16/027* (2006.01)
*G02F 1/01* (2006.01)
*E05F 15/00* (2015.01)

(52) U.S. Cl.
CPC .............. *E06B 9/24* (2013.01); *G02F 1/0121* (2013.01); *H02J 50/10* (2016.02); *E05F 15/00* (2013.01); *E05Y 2900/55* (2013.01)

(56) References Cited

U.S. PATENT DOCUMENTS

| | | |
|---|---|---|
| 2013/0050797 A1 | 2/2013 | Takahashi et al. |
| 2013/0221744 A1 | 8/2013 | Hall et al. |
| 2014/0247473 A1 | 9/2014 | Kuhnen et al. |
| 2015/0103280 A1 | 4/2015 | Wang |
| 2018/0015282 A1 | 1/2018 | Waner et al. |
| 2018/0093611 A1 | 4/2018 | Kim et al. |
| 2018/0095586 A1 | 4/2018 | Cho et al. |
| 2019/0176582 A1 | 6/2019 | Kang |
| 2019/0267840 A1* | 8/2019 | Rozbicki ................. G02F 1/163 |

FOREIGN PATENT DOCUMENTS

| | | |
|---|---|---|
| JP | 2010-224968 A | 10/2010 |
| JP | 2011-111143 A | 6/2011 |
| KR | 10-1995-053125 A | 10/1998 |
| KR | 10-1730155 B1 | 4/2017 |
| KR | 10-2019-0070026 A | 6/2019 |

OTHER PUBLICATIONS

Office Action issued in corresponding U.S. Appl. No. 16/190,036 dated Dec. 20, 2019.

Final Office Action issued in corresponding U.S. Appl. No. 16/007,013 dated Oct. 9, 2020.

* cited by examiner

WIRELESS POWER TRANSFER SYSTEM FOR VEHICLE DOOR GLASS

CROSS-REFERENCE TO RELATED APPLICATION

This application is based on and claims the benefit of priority to Korean Patent Application No. 10-2019-0031742, filed on Mar. 20, 2019, in the Korean Intellectual Property Office, the disclosure of which is incorporated herein in its entirety by reference.

TECHNICAL FIELD

The present disclosure relates to a wireless power transfer system for a vehicle door glass, and more particularly, to a wireless power transfer system for a vehicle door glass, capable of wirelessly supplying power to an electric load of a door glass.

BACKGROUND

In general, a vehicle door is provided with a window regulator that moves a door glass up and down.

The window regulator may be integrated into a door module mounted in the vehicle door, or be directly mounted on an inner panel of the vehicle door. Here, the door module refers to a module in which a latch, the window regulator, and the like are integrated.

In recent years, a variable transparency layer may be provided in the door glass of the vehicle door, and a technology for varying the transparency of the door glass using the variable transparency layer has been researched and developed. By varying the degree of transparency through the variable transparency layer, the door glass may function as light screens or curtains.

An electrical wire may be connected to a connector of the variable transparency layer, and the variable transparency layer may be configured to receive electric energy through electrical wiring. The length of the electrical wire may be enough to correspond to an up-down movement distance of the door glass, thereby facilitating the up and down movement of the door glass.

However, due to the length of the electrical wire, excessive noise may be generated when the door glass is raised and lowered. In particular, as the wire is tensioned during the raising of the door glass, stress may be repeatedly generated in the electrical connector, which may cause the wire to be broken.

In addition, after the window regulator is assembled in the vehicle door, the door glass may be assembled with the window regulator, and then the electrical connector may be connected to the door glass through a narrow gap in the vehicle door. Thus, the assembly process may be complicated and troublesome.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a wireless power transfer system for a vehicle door glass, capable of stably supplying power to an electric load of a door glass.

According to an aspect of the present disclosure, a wireless power transfer system for a vehicle door glass may include: a door glass having an electric load, and a pair of electrodes connected to the electric load; a power transmitter mounted in a vehicle door, and wirelessly transmitting power of a battery; and a power receiver embedded in the door glass, and wirelessly receiving the power from the power transmitter, wherein the power receiver may apply the power received from the power transmitter to the pair of electrodes of the door glass.

The power transmitter may include a transmitting coil wirelessly transmitting AC power, and the power receiver may include a receiving coil wirelessly receiving the AC power from the transmitting coil.

The door glass may have an outdoor glass layer facing the outside of the vehicle, and an indoor glass layer facing the interior of the vehicle, and the electric load may be interposed between the outdoor glass layer and the indoor glass layer.

The receiving coil may be interposed between the outdoor glass layer and the indoor glass layer.

The receiving coil may be a thin film attached to the outdoor glass layer and/or the indoor glass layer by an adhesive layer.

The receiving coil may be patterned on the outdoor glass layer and/or the indoor glass layer by a patterning process.

The patterning process may include photolithography consisting of deposition, exposure, and development, and etching.

The power transmitter may further include: a converter converting DC power to AC power; and a transmitter controller controlling a power level to be output from the converter.

The power receiver may be embedded in a bottom end portion of the door glass.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
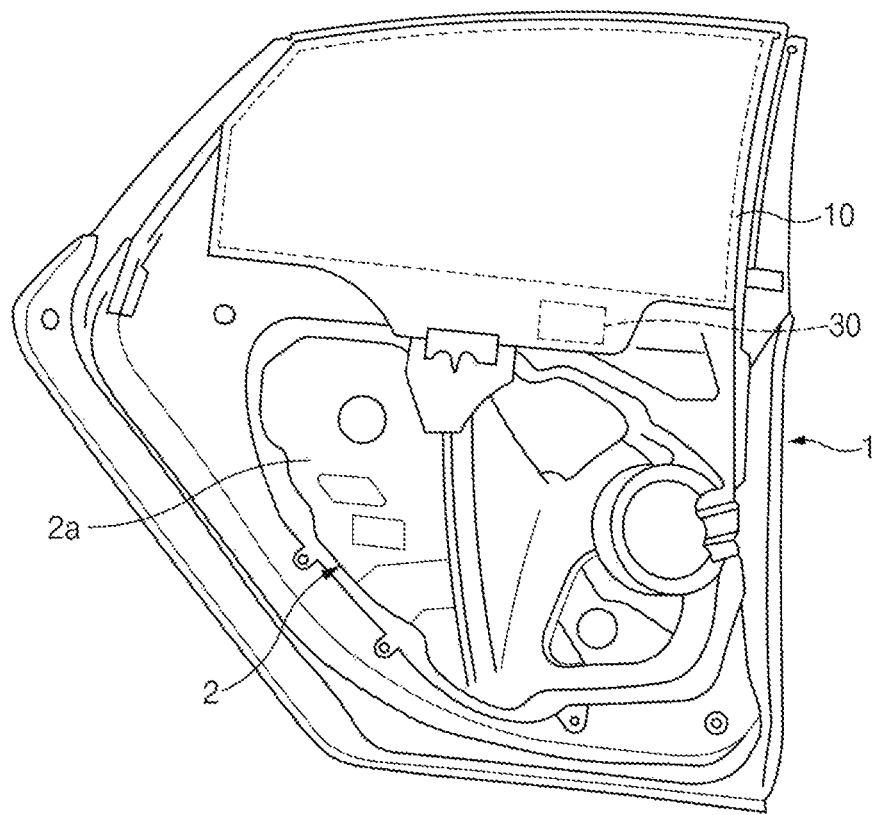
FIG. 1 illustrates a vehicle door equipped with a wireless power transfer system for a vehicle door glass according to an exemplary embodiment of the present disclosure, which is viewed from the outside of the vehicle.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 11:
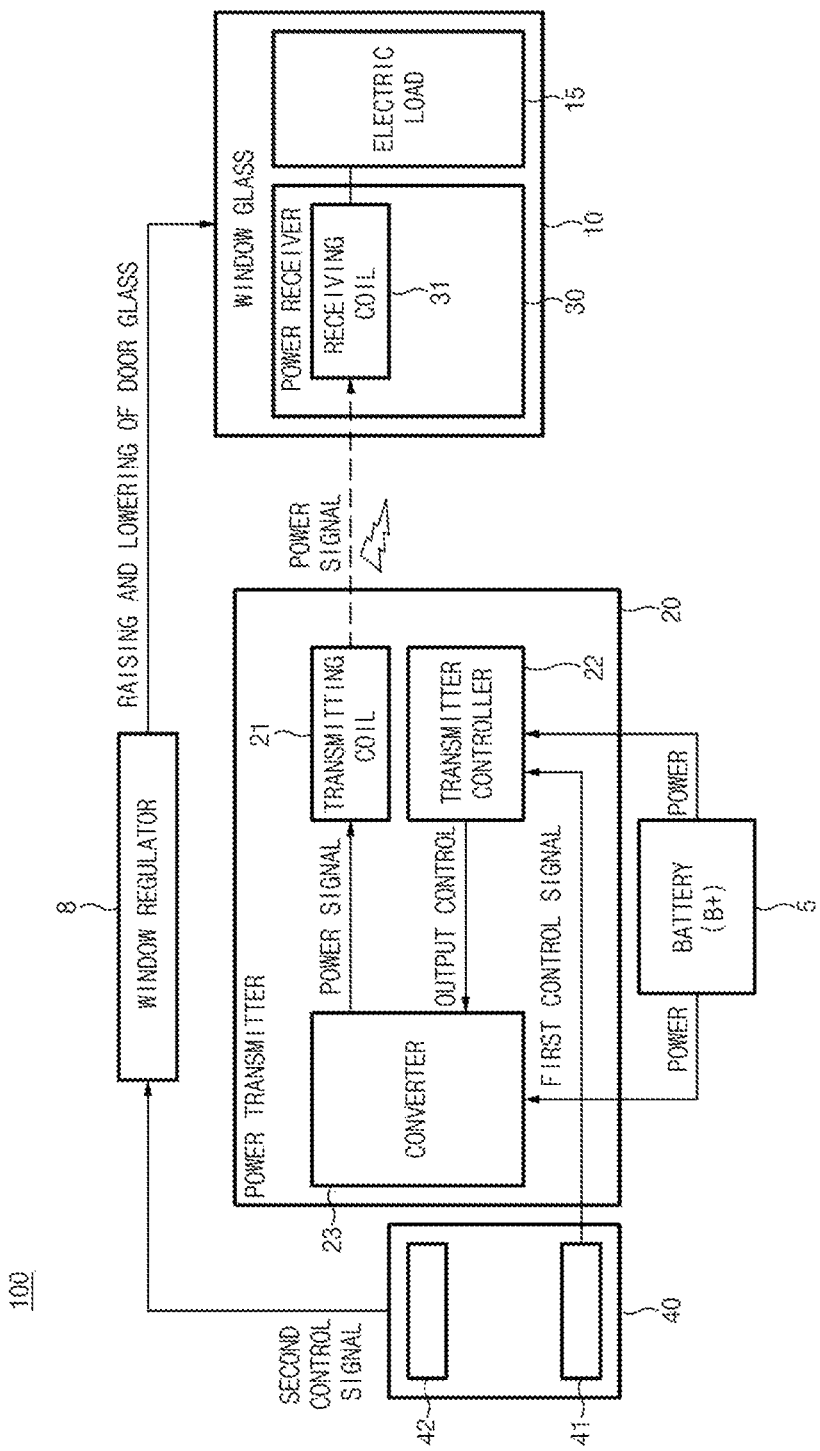
FIG. 11 illustrates a block diagram of a wireless power transfer system for a vehicle door glass according to an exemplary embodiment of the present disclosure.

Referring to FIGS. 1 and 11, a vehicle door 1 may include a door glass 10 and a window regulator 8 (see FIG. 11) for moving the door glass 10 up and down. The door glass 10 may be moved by the window regulator 8 between a fully closed position and a fully opened position. The fully closed position refers to a position at which the door glass 10 fully closes an opening of the vehicle door 1, and the fully opened position refers to a position at which the door glass 10 fully opens the opening of the vehicle door 1.

Figure 2:
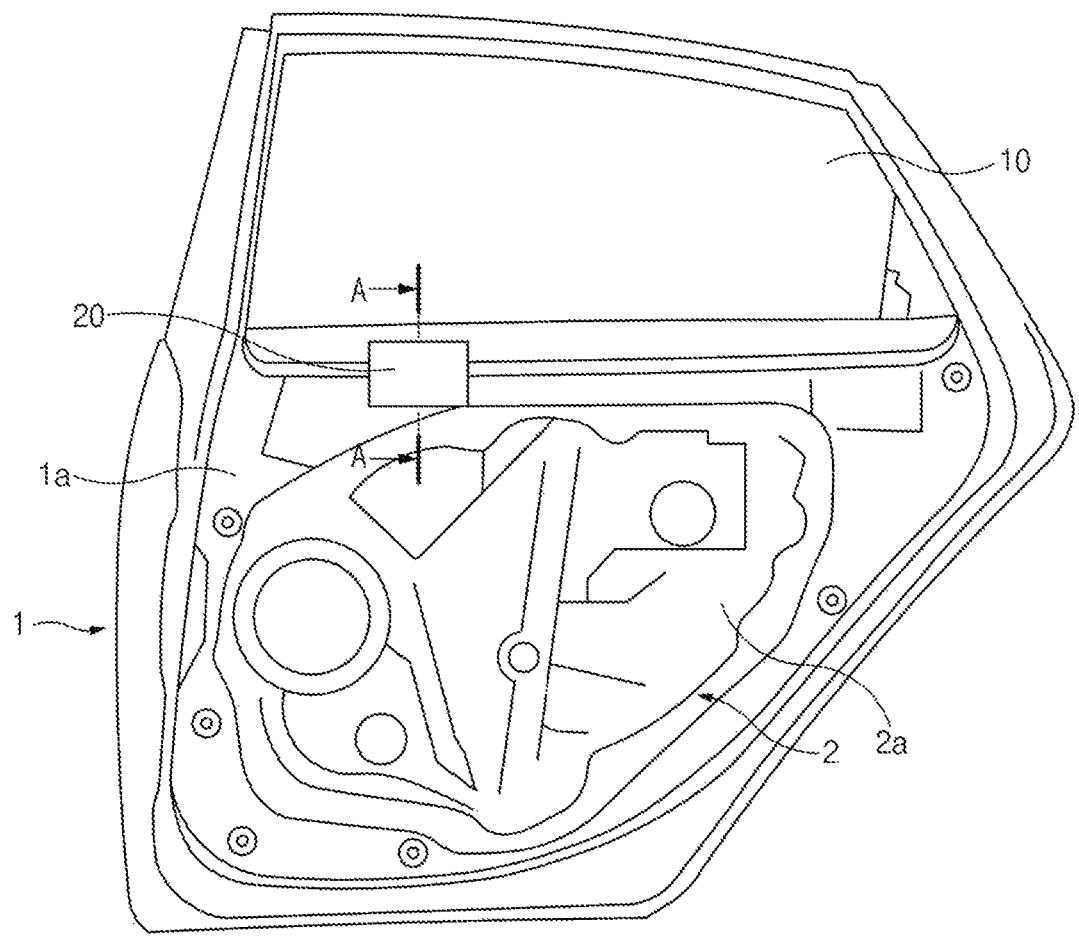
FIG. 2 illustrates a vehicle door equipped with a wireless power transfer system for a vehicle door glass according to an exemplary embodiment of the present disclosure, which is viewed from the interior of the vehicle.
Figure 3:
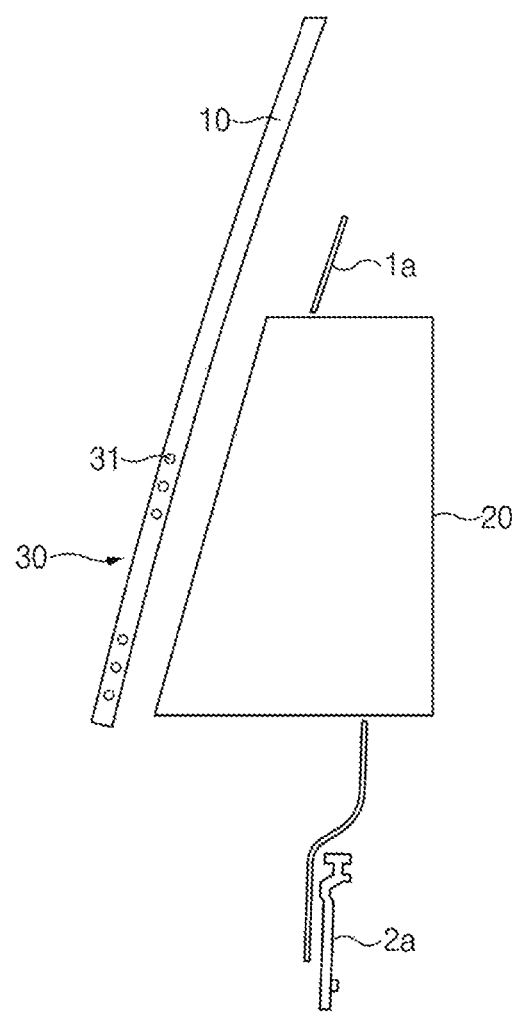
FIG. 3 illustrates a cross-sectional view taken along line A-A of FIG. 2.

According to an exemplary embodiment, as illustrated in FIGS. 1 to 3, the window regulator 8 (see FIG. 11) may be integrated into a door module 2, and the door module 2 may be mounted in the interior space of the vehicle door. The door module 2 may include a door module housing 2a, and the window regulator 8, a latch mechanism (not shown), and the like may be mounted inside the door module housing 2a. The door module housing 2a may be made of a non-conductive material such as synthetic resin.

A wireless power transfer system 100 for a vehicle door glass, according to an exemplary embodiment of the present disclosure, may supply power to an electric load 15 provided in the door glass 10. For example, the electric load 15 may be at least one of a variable transparency layer that varies the transparency of the door glass 10, lighting, and a display.

Alternatively, the electric load 15 may be a combination of the variable transparency layer, the lighting, the display, and/or the like.

The electric load 15 may be embedded in the door glass 10, or be attached to a surface of the door glass 10 facing the interior of the vehicle. The electric load 15 may be configured to use power transmitted by the wireless power transfer system 100.

Referring to FIGS. 1, 2, and 11, the wireless power transfer system 100 for a vehicle door glass, according to an exemplary embodiment of the present disclosure, may include a power transmitter 20 mounted in the vehicle door 1, and a power receiver 30 mounted in the door glass 10.

Referring to FIG. 3, when the door glass 10 is moved to the fully closed position, the power transmitter 20 and the power receiver 30 may face each other. According to an exemplary embodiment, the power transmitter 20 may be mounted on a panel 1a of the vehicle door 1 as illustrated in FIG. 3. According to another exemplary embodiment, the power transmitter 20 may be mounted in the door module housing 2a of the door module 2.

Figure 4:
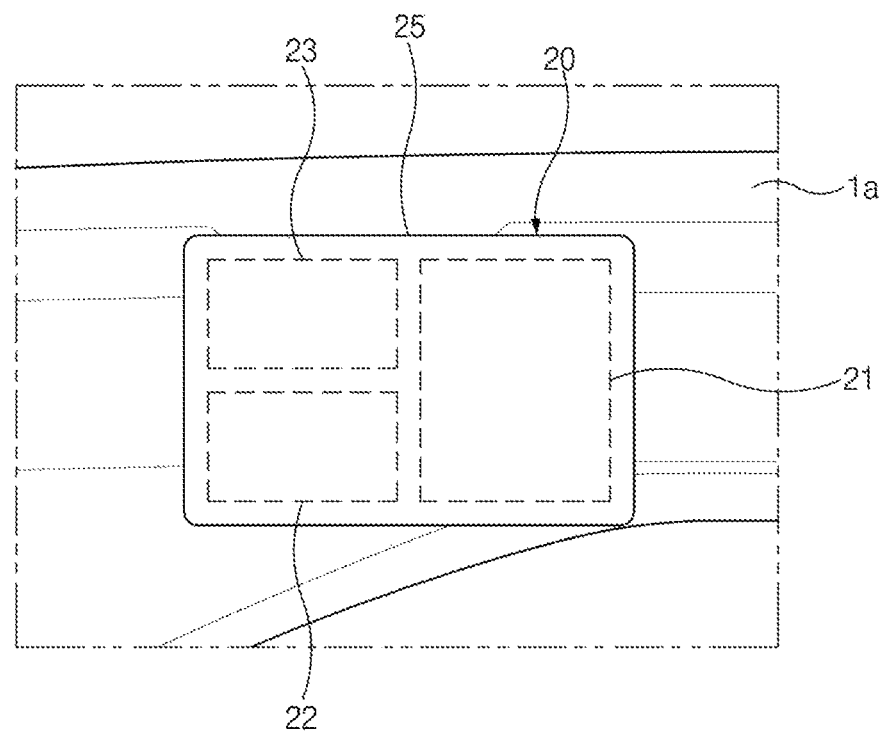
FIG. 4 illustrates a power transmitter in a wireless power transfer system for a vehicle door glass according to an exemplary embodiment of the present disclosure.
Figure 5:
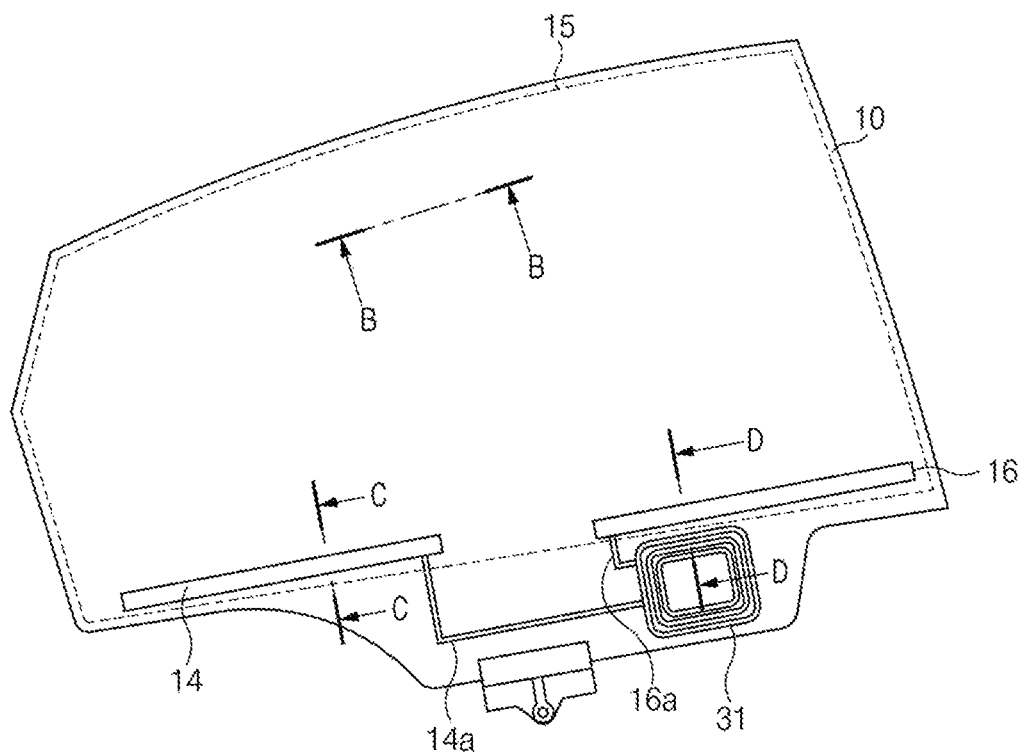
FIG. 5 illustrates a vehicle door glass according to an exemplary embodiment of the present disclosure.

As illustrated in FIG. 4, the power transmitter 20 may include a board 25, a converter 23, a transmitting coil 21, and a transmitter controller 22.

The board 25 may be mounted on the panel 1a of the vehicle door 1 or in the door module housing 2a of the door module 2, and the converter 23, the transmitting coil 21, and the transmitter controller 22 may be arranged on the board 25.

The converter 23 may be a DC to AC converter converting direct current (DC) power supplied from a battery 5 into alternating current (AC) power required for wireless power transfer. In particular, the converter 23 may convert DC power supplied from the battery 5 into an AC power signal under control of the transmitter controller 22.

The transmitting coil 21 may receive the AC power signal from the converter 23, and transmit the power to a receiving coil 31 of the power receiver 30 wirelessly by electromagnetic induction. The transmitting coil 21 may be coupled to a transmitter impedance-matching structure (not shown).

The transmitter controller 22 may receive a control signal for controlling the operation of the electric load 15, and the control signal may be generated by manipulating switches 41 and 42 of a manipulation device 40. The transmitter controller 22 may control the operation of the converter 23 and a power level to be output from the converter 23 according to the received control signal.

The converter 23 may convert the DC power into the AC power signal having a frequency suitable for induction of the power signal under control of the transmitter controller 22.

According to an exemplary embodiment, the transmitter controller 22 may adjust the amplitude of AC voltage (per hour) output from the converter 23 according to the received control signal to thereby control the output power level of the converter 23.

The transmitter controller 22 may include a processor and a memory. The processor may receive instructions and data stored in the memory, and transmit instructions to the converter 23. The memory may be a data store, such as a hard disk drive, a solid state drive, a volatile storage medium, or a non-volatile storage medium.

The transmitter controller 22 may control the output power level of the converter 23 to thereby control the operation of the electric load 15. In addition, the transmitter controller 22 may transmit a feedback signal related to the operation, state, and the like of the electric load to the manipulation device 40. The transmitter controller 22 and the converter 23 may be electrically connected to the battery 5, so that the transmitter controller 22 and the converter 23 may operate with the DC power supplied from the battery 5.

The power receiver 30 may receive power from the power transmitter 20 wirelessly to supply the power to the electric load 15 of the door glass 10.

According to an exemplary embodiment, the power receiver 30 may be embedded in a bottom end portion of the door glass 10 as illustrated in FIG. 3, so that the power receiver 30 and the door glass 10 may be configured as a unitary one-piece structure, which improve assemblability and durability of the door glass 10.

As illustrated in FIGS. 5 to 8, the power receiver 30 may include the receiving coil 31 embedded in the bottom end portion of the door glass 10, and a pair of lead wires 14a and 16a connecting the receiving coil 31 to electrodes 14 and 16 of the electric load 15, respectively. The receiving coil 31 may be individually connected to the pair of electrodes 14 and 16 through the pair of lead wires 14a and 16a. The pair of electrodes 14 and 16 may be a positive electrode 14 and a negative electrode 16.

Figure 8:
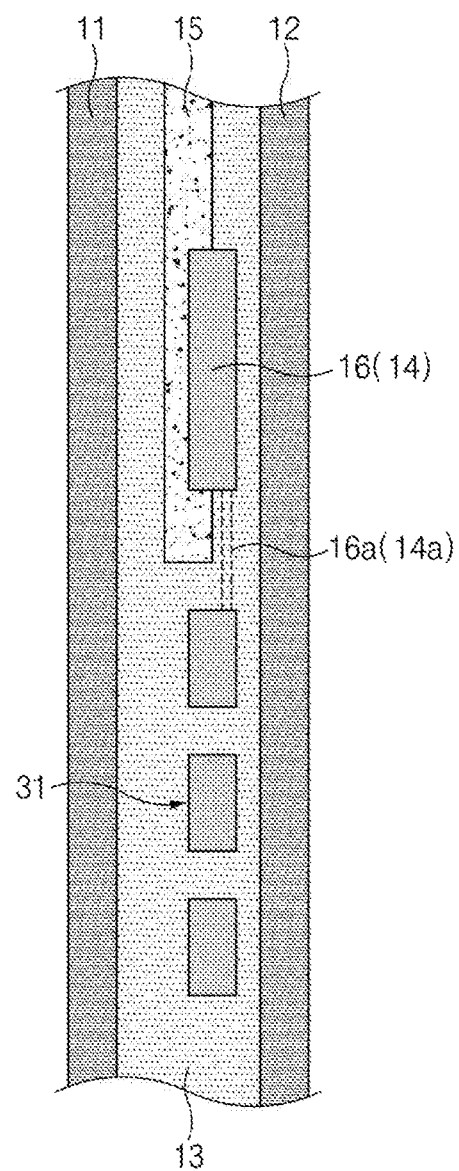
FIG. 8 illustrates a cross-sectional view taken along line D-D of FIG. 5.

According to an exemplary embodiment, the receiving coil 31 may be a thin film attached between an outdoor glass layer 11 and an indoor glass layer 12 by an adhesive layer 13 as illustrated in FIG. 8. The adhesive layer 13 may be made of a non-conductive material. The non-conductive adhesive layer 13 may surround the periphery of the receiving coil 31, so that electrical stability of the receiving coil 31 may be secured. The pair of electrodes 14 and 16 and the pair of lead wires 14a and 16a may be electrically connected to the receiving coil 31, and the pair of electrodes 14 and 16 and the pair of lead wires 14a and 16a may be thin films interposed between the outdoor glass layer 11 and the indoor glass layer 12 by the adhesive layer 13. According to another exemplary embodiment, the receiving coil 31, the pair of electrodes 14 and 16, and the pair of lead wires 14a and 16a may be formed on the outdoor glass layer 11 and/or the indoor glass layer 12 by a patterning process. The patterning process may include photolithography consisting of deposition, exposure, and development, and etching. The receiving coil 31 may be patterned on the indoor glass layer 12 or the outdoor glass layer 11, or may be patterned on both the indoor glass layer 12 and the outdoor glass layer 11.

Figure 9:
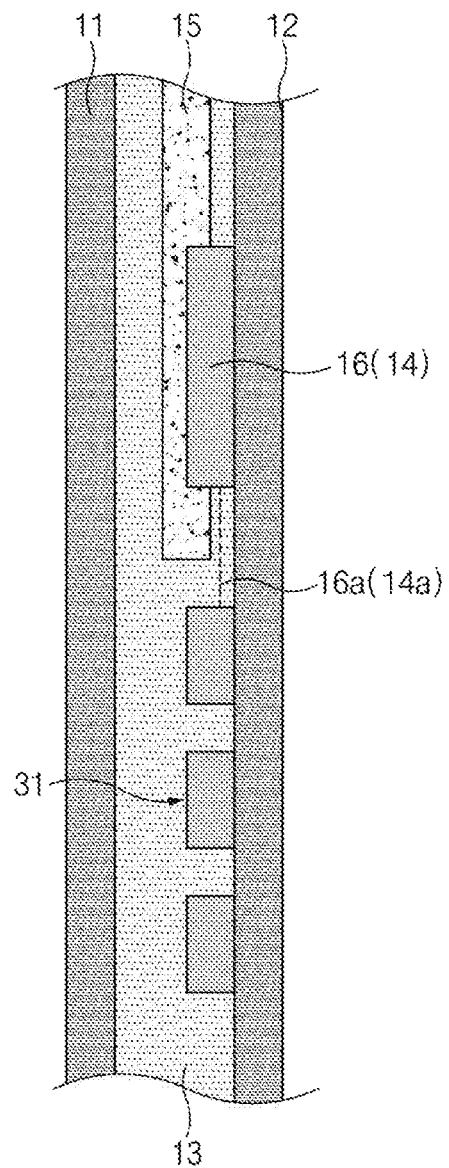
FIG. 9 illustrates a modification to the embodiment of FIG. 8.

Referring to FIG. 9, as the power transmitter 20 is disposed to face the interior space of the vehicle, the receiving coil 31 may be patterned on the indoor glass layer 12 and/or the outdoor glass layer 11 by photolithography. Since a gap between the receiving coil 31 and the power transmitter 20 is narrowed, the receiving coil 31 may easily receive power from the power transmitter 20 wirelessly. In addition, the pair of electrodes 14 and 16, and the pair of lead wires 14a and 16a together with the receiving coil 31 may be patterned on the indoor glass layer 12 by a semiconductor process.

Figure 10:
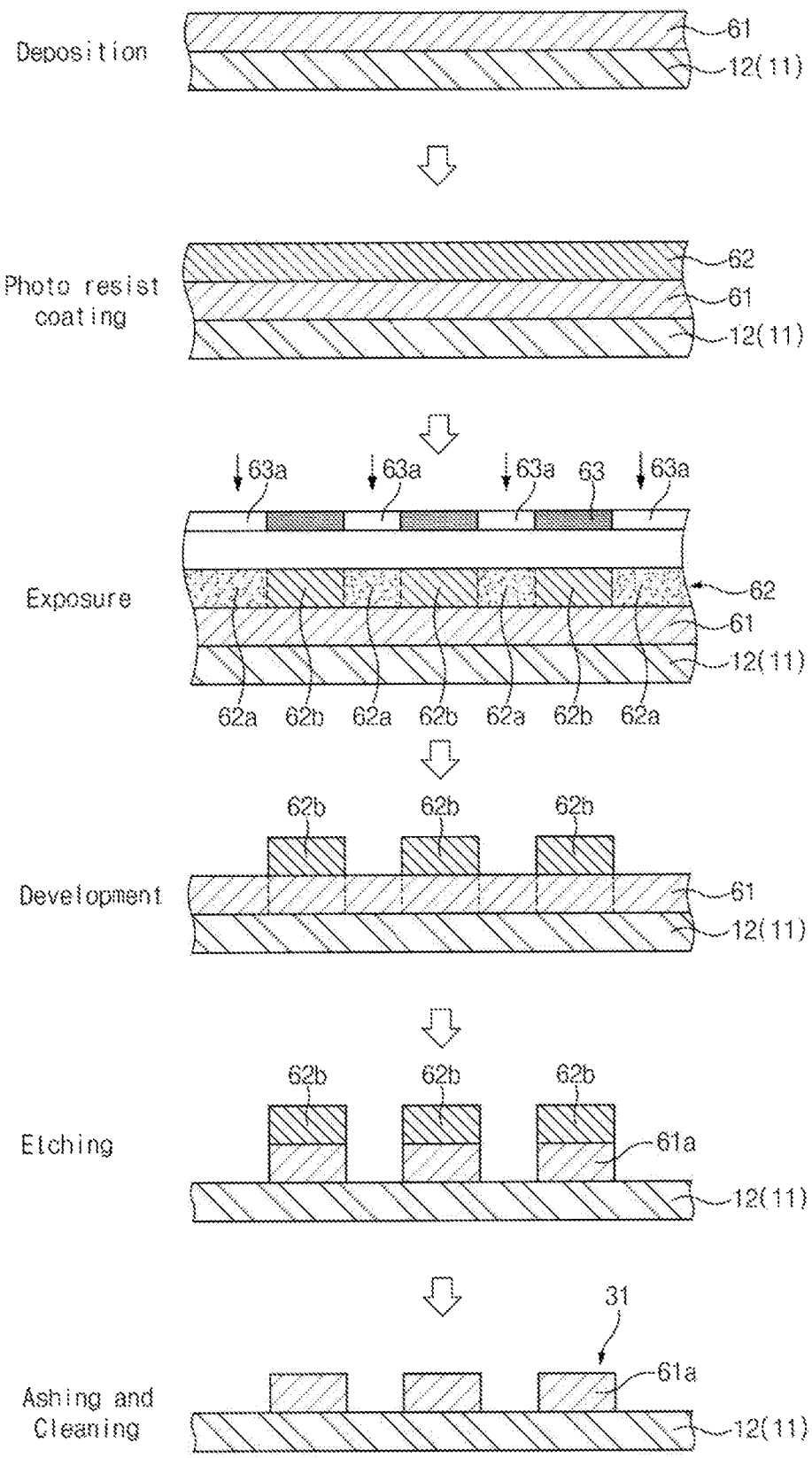
FIG. 10 illustrates a process of patterning a receiving coil on an indoor glass layer.

FIG. 10 illustrates a process of patterning the receiving coil 31 on the indoor glass layer 12.

Referring to FIG. 10, after the surface of the indoor glass layer 12 is cleaned, a conductive thin film 61 may be deposited on the surface of the indoor glass layer 12 (deposition). The thin film 61 may be coated with a photoresist 62, which is a light-sensitive material (photoresist coating). The photoresist 62 may be a positive photoresist or a negative photoresist. In FIG. 10, the positive photoresist may be used. A photomask 63 having a plurality of light transmitting portions 63a may be disposed on the photoresist 62, and the photomask 63 may be irradiated with light, so that at least some portions of the photoresist 62 may be exposed to light through the light transmitting portions 63a of the photomask 63 (exposure). Accordingly, the photoresist 62 may be divided into exposed portions 62a, which are exposed to light, and unexposed portions 62b, which are not exposed to light. The exposed portions 62a of the photoresist 62 may be removed by a photoresist development (development). Portions of the thin film 61 aligned with the removed exposed portions 62a of the photoresist 62 may be etched by dry etching, wet etching, or the like, so that the remaining portions 61a of the thin film 61 may form a predetermined pattern on the surface of the indoor glass layer 12 (etching). Then, the photoresist 62 may be removed and cleaned by an asher or the like, and the receiving coil 31 may be provided in the predetermined pattern on the surface of the indoor glass layer 12 (ashing and cleaning). In this manner, the receiving coil 31 may be patterned on the surface of the indoor glass layer 12 by the deposition, exposure, development, etching, ashing and cleaning steps. Referring to FIG. 9, the indoor glass layer 12 to which the receiving coil 31 is attached may be bonded to the outdoor glass layer 11 by the adhesive layer 13. The non-conductive adhesive layer 13 interposed between the indoor glass layer 12 and the outdoor glass layer 11 may surround the periphery of the receiving coil 31, so that the electrical stability of the receiving coil 31 may be secured. In addition, the pair of electrodes 14 and 16 and the pair of lead wires 14a and 16a may be electrically connected to the receiving coil 31, and the pair of electrodes 14 and 16 and the pair of lead wires 14a and 16a may be patterned on the outdoor glass layer 11 and/or the indoor glass layer 12 by the above-described patterning process. The receiving coil 31 may receive the AC power from the transmitting coil 21 wirelessly by electromagnetic induction. The receiving coil 31 may be coupled to a receiver impedance-matching structure (not shown).

Figure 6:
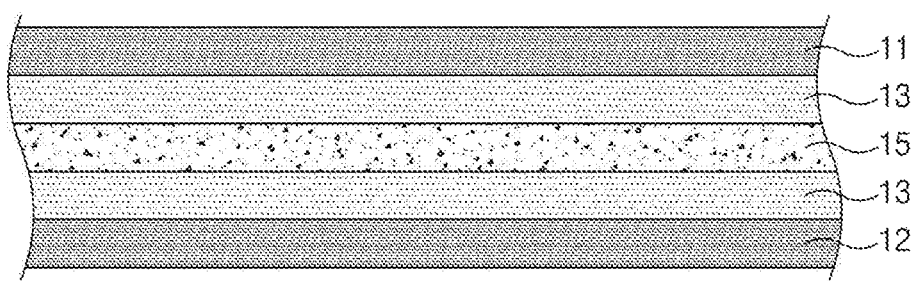
FIG. 6 illustrates a cross-sectional view taken along line B-B of FIG. 5.
Figure 7:
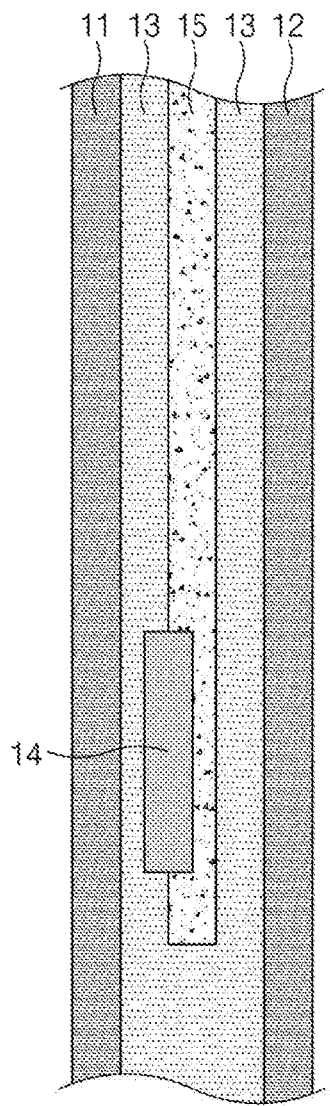
FIG. 7 illustrates a cross-sectional view taken along line C-C of FIG. 5.

As illustrated in FIGS. 6 to 8, the door glass 10 may include the outdoor glass layer 11 facing the outside of the vehicle, the indoor glass layer 12 facing the interior of the vehicle, and the electric load 15 interposed between the outdoor glass layer 11 and the indoor glass layer 12.

The outdoor glass layer 11 and the indoor glass layer 12 may be made of a transparent or translucent material, and the outdoor glass layer 11 and the indoor glass layer 12 may be attached to opposing surfaces of the electric load 15.

For example, the outdoor glass layer 11 and the indoor glass layer 12 may be attached to the opposing surfaces of the electric load 15 using the adhesive layer 13. The adhesive layer 13 may be formed by applying a transparent adhesive to the entire surface of the electric load 15 or applying a transparent adhesive to edges of the electric load 15.

As another example, when the electric load 15 is made of a material having adhesiveness, the outdoor glass layer 11 and the indoor glass layer 12 may be attached to the opposing surfaces of the electric load 15 without the use of an adhesive. Alternatively, the outdoor glass layer 11 and the indoor glass layer 12 may be attached to the opposing surfaces of the electric load 15 by various methods with static cling, surface tension, or the like, without the use of an adhesive.

According to an exemplary embodiment, the electric load 15 may be a variable transparency layer which is designed to maintain an opaque state when electric energy is not applied, and to be changed to a transparent state when electric energy is applied. When an AC voltage higher than or equal to a predetermined voltage is applied to the variable transparency layer, the arrangement of molecules constituting the variable transparency layer may change so that light transmittance may be varied. The light transmittance of the variable transparency layer may vary according to the amplitude of AC voltage. As the AC voltage increases, a variation in light transmittance may increase. However, when the applied voltage reaches a saturation point, the light transmittance may not change any more.

According to another exemplary embodiment, the electric load 15 may be a variable transparency layer which is designed to maintain a transparent state when electric energy is not applied, and to be changed to an opaque state when electric energy is applied.

Figure 12:
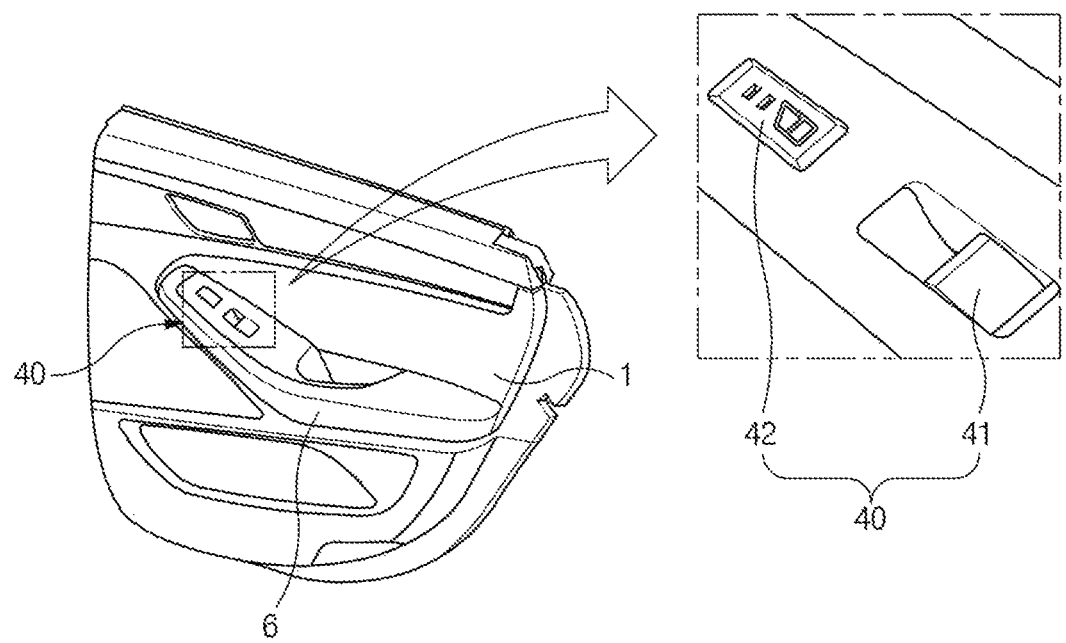
FIG. 12 illustrates a manipulation device connected to a wireless power transfer system for a vehicle door glass according to an exemplary embodiment of the present disclosure.

Referring to FIGS. 11 and 12, the wireless power transfer system 100 may further include the manipulation device 40 connected to the transmitter controller 22.

The manipulation device 40 may be disposed on an armrest 6 of the vehicle door 1 as illustrated in FIG. 12. The manipulation device 40 may include a raising and lowering switch 41 generating a second control signal for raising and lowering the door glass 10, and an electric load operation switch 42 generating a first control signal for operating the electric load 15.

The second control signal may be transmitted to the window regulator 8 by manipulating the raising and lowering switch 41, and the degree of raising and lowering the door glass 10 may be adjusted by the second control signal.

The first control signal may be transmitted to the transmitter controller 22 by manipulating the electric load operation switch 42, whereby the operation of the electric load 15 may be controlled. For example, when the electric load 15 is a variable transparency layer, a control signal for varying the degree of transparency (light transmittance) of the variable transparency layer may be transmitted to the transmitter controller 22 of the power transmitter 20 by manipulating the electric load operation switch 42, and the transparency (light transmittance) of the door glass 10 may be varied according to the control signal received by the receiving coil 31 of the power receiver 30.

Referring to FIG. 11, the operation of the wireless power transfer system 100 for a vehicle door glass, according to an exemplary embodiment of the present disclosure, will be detailed below.

When a user manipulates the electric load operation switch 42 of the manipulation device 40, a control signal may be transmitted to the transmitter controller 22.

The transmitter controller 22 may determine whether or not the door glass 10 is fully closed by detecting position information of the door glass 10 through a controller of the window regulator 8.

When the transmitter controller 22 determines the fully closed state of the door glass 10, the transmitter controller 22 may control an output level of the converter 23 so as to output a power level corresponding to the degree of manipulation of the electric load operation switch 42 from the battery 5.

The converter 23 may convert DC current adjusted by the transmitter controller 22 into AC current, and apply the AC current to the transmitting coil 21.

The AC current may be transmitted from the converter 23 to the transmitting coil 21, and the transmitting coil 21 may transmit the AC current to the receiving coil 31 of the power receiver 30 by electromagnetic induction. The receiving coil 31 may apply AC voltage to the electrodes 14 and 16 through the lead wires 14*a* and 16*a*.

The AC current applied to the electrodes 14 and 16 may be transmitted to the electric load 15 of the door glass 10, and the electric load 15 may operate. For example, when the electric load 15 is a variable transparency layer, the molecule structure of the variable transparency layer may be arranged so that the door glass 10 may be changed to a transparent state of predetermined light transmittance.

Figure 13:
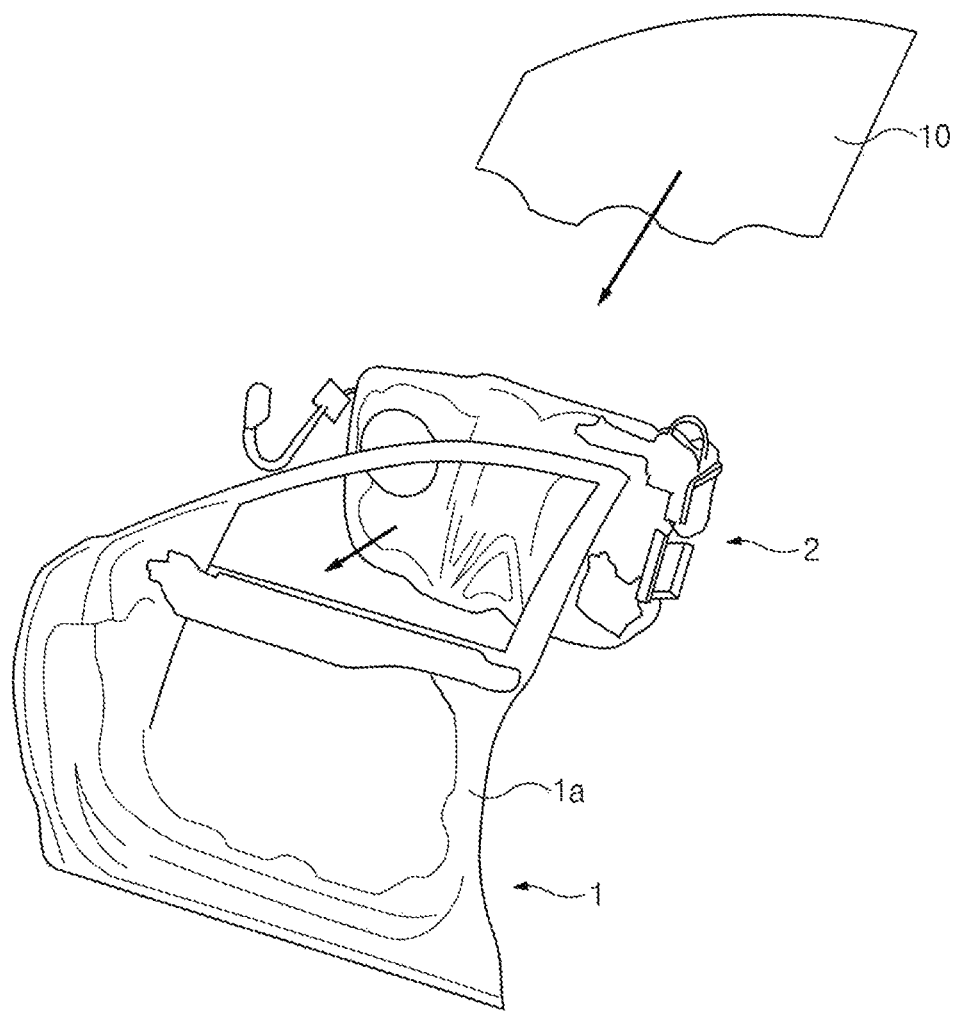
FIG. 13 illustrates a process of assembling a door module into a vehicle door.
Figure 14:
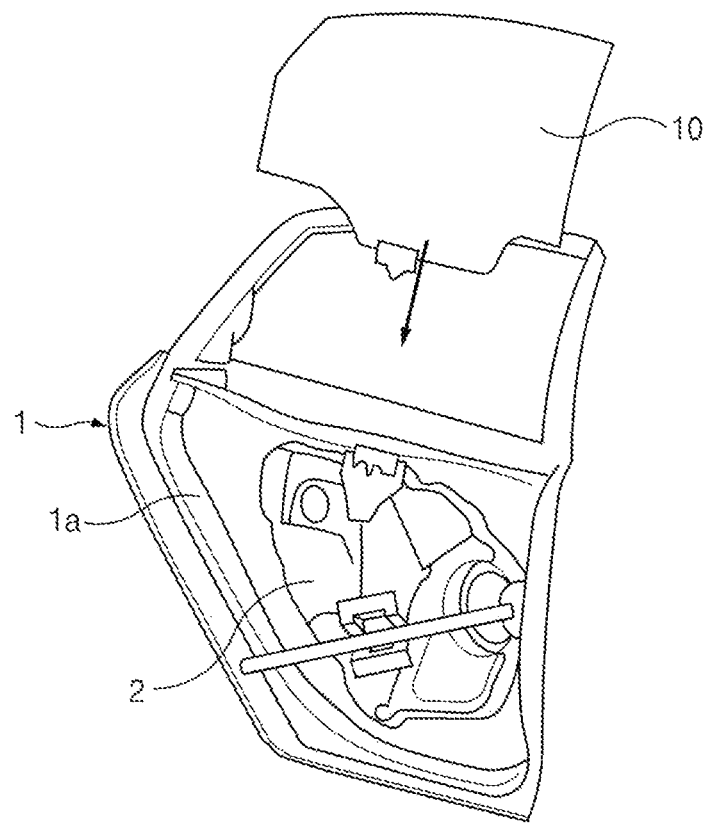
FIG. 14 illustrates a process of assembling a door glass into a vehicle door.

FIGS. 13 and 14 illustrate an assembly process of the wireless power transfer system 100 for a vehicle door glass, according to an exemplary embodiment of the present disclosure.

As illustrated in FIG. 13, the door module 2 may be assembled into the vehicle door 1. Here, the power transmitter 20 may be assembled to the panel 1*a* of the vehicle door 1 before the door module 2 is assembled to the panel 1*a* of the vehicle door 1, or after the door module 2 is assembled to the panel 1*a* of the vehicle door 1.

Then, as illustrated in FIG. 14, the door glass 10 having the power receiver 30 embedded therein may be assembled into the vehicle door 1.

The power receiver 30 may be embedded in the inside of the door glass 10, so that the power receiver 30 and the door glass 10 may be configured as a unitary one-piece structure, which improve durability and assemblability of the door glass 10.

As set forth above, the wireless power transfer system according to exemplary embodiments of the present disclosure may stably supply power to the electric load of the door glass through wireless power transfer, thereby accurately controlling the electric load of the door glass, preventing the problems of noise, breaking of wire, etc., and improving durability and assemblability.

In particular, the power receiver may be embedded in the inside of the door glass so that the power receiver and the door glass may be configured as a unitary one-piece structure, which improve durability and assemblability of the door glass.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wireless power transfer system for a vehicle door glass, the wireless power transfer system comprising:
a door glass having an electric load, and a pair of electrodes connected to the electric load;
a power transmitter mounted in a vehicle door, and including a transmitting coil wirelessly transmitting power of a battery; and
a power receiver embedded in the door glass, and including a receiving coil wirelessly receiving the power from the power transmitter,
wherein the power receiver applies the power received from the power transmitter to the pair of electrodes of the door glass,
wherein the door glass has an outdoor glass layer facing an outside of the vehicle, and an indoor glass layer facing an interior of the vehicle, and
wherein the receiving coil is a thin film attached to at least one of the outdoor glass layer or the indoor glass layer by an adhesive layer.

2. The wireless power transfer system according to claim 1, wherein the transmitting coil wirelessly transmits alternating current (AC) power, and
wherein the receiving coil wirelessly receives the AC power from the transmitting coil.

3. The wireless power transfer system according to claim 2, wherein the electric load is interposed between the outdoor glass layer and the indoor glass layer.

4. The wireless power transfer system according to claim 2, wherein the power transmitter further includes:
   a converter converting direct current (DC) power to AC power; and
   a transmitter controller controlling a power level to be output from the converter.

5. The wireless power transfer system according to claim 1, wherein the receiving coil is interposed between the outdoor glass layer and the indoor glass layer.

6. The wireless power transfer system according to claim 1, wherein the power receiver is embedded in a bottom end portion of the door glass.

7. A wireless power transfer system for a vehicle door glass, the wireless power transfer system comprising:
   a door glass having an electric load, and a pair of electrodes connected to the electric load;
   a power transmitter mounted in a vehicle door, and including a transmitting coil wirelessly transmitting power of a battery; and
   a power receiver embedded in the door glass, and including a receiving coil wirelessly receiving the power from the power transmitter,
   wherein the power receiver applies the power received from the power transmitter to the pair of electrodes of the door glass,
   wherein the door glass has an outdoor glass layer facing an outside of the vehicle, and an indoor glass layer facing an interior of the vehicle and,
   wherein the receiving coil is patterned on at least one of the outdoor glass layer or the indoor glass layer by a patterning process.

8. The wireless power transfer system according to claim 7, wherein the patterning process includes photolithography consisting of deposition, exposure, and development, and etching.

9. The wireless power transfer system according to claim 7, wherein the transmitting coil wirelessly transmits alternating current (AC) power, and
   wherein the receiving coil wirelessly receives the AC power from the transmitting coil.

10. The wireless power transfer system according to claim 7, wherein the electric load is interposed between the outdoor glass layer and the indoor glass layer.

11. The wireless power transfer system according to claim 7, wherein the receiving coil is interposed between the outdoor glass layer and the indoor glass layer.

* * * * *